March 21, 1967  T. W. MILLER  3,310,011
HERBICIDE AND OTHER AGRICULTURAL
CHEMICAL DISTRIBUTOR
Filed April 5, 1965
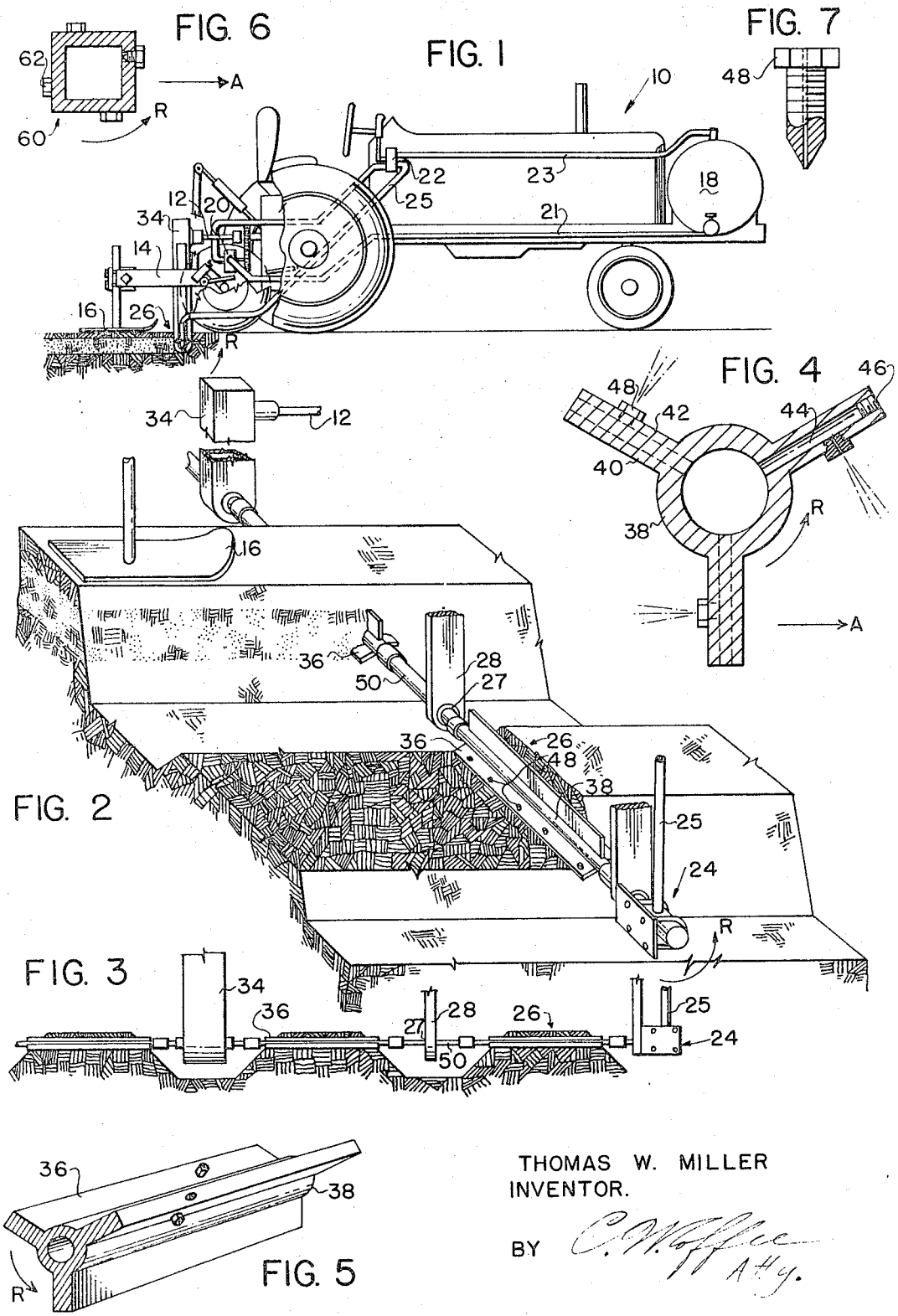
THOMAS W. MILLER
INVENTOR.
BY

United States Patent Office 3,310,011
Patented Mar. 21, 1967

3,310,011
HERBICIDE AND OTHER AGRICULTURAL
CHEMICAL DISTRIBUTOR
Thomas W. Miller, Box 666, Dimmitt, Tex. 79027
Filed Apr. 5, 1965, Ser. No. 445,598
7 Claims. (Cl. 111—1)

This invention relates to an agricultural chemical distributor and more particularly to a rod weeder for distributing and incorporating herbicide or other chemical below the surface of the earth.

In present agricultural practice it is often desirable to distribute herbicides and other chemicals such as fertilizers or insecticides or pesticides or fungicides beneath the surface of the ground. It is desirable that many of the chemicals be placed in a band quite close to the top of the ground.

Other workers such as shown by Phillips U.S. Patent No. 3,146,740 have recognized a desirability of distributing chemicals in connection with "rod weeders," a term used to designate a horizontal rotating rod which operate beneath the surface of the soil.

A device according to this invention would distribute the chemicals through a hollow rod weeder of non-circular configuration.

An object of this invention is to distribute and incorporate agricultural chemicals into the soil.

Another object of this invention is to distribute agricultural chemicals by use of a hollow rod weeder, the chemicals being distributed through nozzles in the rod weeder.

Another object is to distribute the chemical in a band under the ground so that the operation is not dependent upon rain nor hampered by wind.

A further object is to provide a novel design of a hollow bar adapted for the above purposes.

A further object is to mix the chemical with the soil after distribution.

Still further objects are to achieve the above with a device that is sturdy, compact, durable, simple, versatile, and reliable, yet inexpensive and easy to manufacture and operate.

Still further objects are to achieve the above with a method that is rapid, inexpensive, and does not require skilled people to operate.

The specific nature of the invention as well as other objects, uses, and advantages thereof will clearly appear from the following description and from the accompanying drawing, the different views of which are not to the same scale, in which:

FIG. 1 is a side elevation view, somewhat schematic of equipment mounted on a tractor, according to this invention.

FIG. 2 is a partial perspective view, partially broken away, of the rod weeders in operation.

FIG. 3 is a sectional view showing the rod weeders.

FIG. 4 is an enlarged sectional view of the rod weeder.

FIG. 5 is a partially enlarged perspective view of the rod weeder.

FIG. 6 is a sectional view of an alternate form of rod weeder.

FIG. 7 is an enlarged view of the nozzle of FIG. 4.

Referring more particularly to the drawings the apparatus is designed to mount upon a standard farm tractor 10 and to be driven by the power take-off shaft 12 thereof. The apparatus includes a general frame 14 headed to the tractor with a plurality of ground engaging skids 16. It will be understood by those skilled in the art that the skids could be in the form of "bed shapers."

Tank 18 is mounted upon the tractor for carrying liquid agricultural chemicals such as herbicides. Pump 20 has the intake pipe 21 attached to the bottom of the tank 18 and its outlet into pressure regulator 22 which is provided with a return pipe 23 to the tank 18. The regulator is connected by pipe 25 to rotating seals 24 to a circular section 50 of the rod weeder bar 26.

The rod weeder bar 26 is journalled in a plurality of bearings 27 which are attached to depending shanks 28 from the frame 14. The pump 20 is drivingly connected to the power take-off shaft 12. The rod weeder bar 26 is driven from gear box 34 on the frame 14 which is also connected to the power take-off shaft 12.

The rod weeder 26 is adapted to be used with listed or bedded land. In this way the shanks 28 and the seal 24 fit into furrows between the beds and the rod weeder bar 26 runs through the beds cultivating them while distributing and incorporating the chemical therethrough. Therefore the rod weeder bar includes a plurality of non-round sections 36 which have a plurality of nozzles 38 in them for distributing chemical from them.

Referring specifically to FIGS. 2, 4, and 5 it may be seen that the section 36 may take the form of a cylindrical pipe 38 with a plurality of radial flanges 40 connected thereto. The bar is adapted to be drawn through the ground in the direction of arrow A and rotated in the direction of arrow R. Each of the flanges has a near radial face 42 which is on the rear face of the flange. By the rear face is meant that side which is not forced against the earth or the soil as it is rotated in operation. The space between flanges is considered grooves. The flanges have radial holes 44 drilled in them each of which is stopped on its external portion by plug 46. From the rear face 42 there is a second bore entering into the radial bore 44 and nozzle 48 is threaded into the second bore. Referring to FIG. 5 it will be seen that the nozzles on the radial flanges are staggered so that there is an even, uniform distribution of the chemical into the soil.

The non-round sections are alternated with the circular sections 50 of the weeder 26. The circular sections 50 operate within the furrows and have the attachments of the bearings 27 and the seals 24 thereto. The non-round sections 36 of the weeder 26 operate within the bed and beneath the soil.

This arrangement provides certain advantages such as ready access for repair and replacement and adjustability. The non-round sections are threaded to the round sections. Therefore any one particular section may be removed and replaced. Furthermore in some instances the beds will be 40 inches on center where in others they will be some other distance, for example 30 inches. By adjustment of the length of the non-round sections 50 different bed spacings may be accommodated using the same non-round sections 36 for any of the bed spacings. It will be necessary when changing bed spacings to adjust the spacing of the shanks 28 upon the frame 14; this is conventional in agricultural equipment.

It will be noted that as the chemical is uniformly distributed in the soil beneath the surface thereof, the soil is cultivated and further that the chemical is mixed with the soil inasmuch as the soil is simultaneously stirred or mixed as the chemical is introduced therein.

FIG. 6 illustrates a sectional view of an alternate form of the rod weeder. In this instance the non-round section 60 is of a square cross section. Nozzles 62 are in one of the sides near and immediately behind the leading corner. The leading corner is that corner which engages the soil as it is rotated in the direction of arrow R and moves through the soil in the direction of arrow A. It will be seen that the nozzle 62 is immediately rearward the corner so that it is protected and not run into the soil excessively. This is important if the nozzles are to be kept free so that they discharge a jet of chemical into the soil.

Adjustment of the depth of the bar 26 is made by adjustment of the skids 16 at the frame 14.

Obviously those skilled in the art can see many alternate forms of the invention, e.g. alternate forms of the non-round sections could be endless. Also other mechanical changes would be well within the skill of the art, e.g. the pump 20 could be driven from a gage wheel rather than directly from the power take off shaft of the tractor.

It will be apparent that the embodiments shown are only exemplary and that various modifications can be made in construction, materials, and arrangement within the scope of the invention as defined in the appended claims.

I claim as my invention:

1. A machine for incorporating agricultural chemicals into the soil comprising:
   (a) a frame,
   (b) means for drawing said frame along the ground,
   (c) a plurality of shanks depending from said frame,
   (d) chemical supply means mounted on said frame,
   (e) a hollow rod journaled to said shanks, rotatable therein and disposed transversely of the line of travel of said frame,
   (f) said shanks forming means for operating said rod beneath the surface of the earth,
      (ff) said rod having circumferentially-disposed earth working portions, the length of which are no greater than about the diameter of the rod,
   (g) said portions having apertures defined therein and in fluid communication with said hollow rod which, in turn, is in fluid communication with said chemical supply means, whereby when said machine is in motion the chemicals are dispensed and worked into said soil.

2. The invention as defined in claim 1 with the addition of
   (h) means for controlling the depth at which the horizontal rod travels beneath the surface.

3. The invention as defined in claim 1 wherein
   (h) said rod is formed of a plurality of disconnectable earth-working sections and circular sections,
   (j) said earth-working sections being alternated with said circular sections, and
   (k) said shanks being journaled to the rod at the circular sections; whereby the rod is readily disconnectable for maintenance and adjustment to different row spacings.

4. The invention as defined in claim 1 wherein
   (h) said apertures have nozzles threaded therein, said nozzles forming metered apertures for metering jets of agricultural chemicals dispensed therefrom.

5. A weeder rod adapted to be drawn through the ground at right angles thereto while being rotated and while dispensing chemicals therefrom for the purpose of incorporating the dispensed chemicals into the soil comprising:
   (a) an elongated rod,
   (b) said rod having circumferentially-disposed earth working portions, the length of which are no greater than about the diameter of the rod,
   (c) a conduit through the center of the rod,
   (d) said portions having apertures defined therein and
   (e) in fluid communication with said conduit through the center of said rods, and
   (f) nozzles threaded into said apertures for metering a predetermined amount of chemicals from each aperture.

6. The invention as defined in claim 5 with the addition of
   (g) a plurality of above defined elongated rods and
   (h) a plurality of circular sections
   (j) threaded to the elongated rods.

7. The method of applying fluid agricultural chemicals below the surface of the soil and mixing them within the soil comprising:
   (a) injecting the chemicals into an elongated dispensing means adapted to contain fluid,
   (b) moving the means
      (i) transversely of its length
      (ii) the axis of the means a shallow distance below the surface of the ground, and
      (iii) rotating the means about its axis, and
   (c) dispensing fluid from and substantially along the entire length of the means.

References Cited by the Examiner

UNITED STATES PATENTS

| | | | |
|---|---|---|---|
| 1,852,908 | 4/1932 | Vise | 172—174 |
| 2,346,317 | 4/1944 | Lyle | 172—540 |
| 2,870,850 | 1/1959 | Dethlefsen | 172—554 |
| 2,954,085 | 9/1960 | Roberts | 172—44 |
| 2,987,125 | 6/1961 | Singleton | 172—393 |
| 3,146,740 | 9/1964 | Phillips | 111—7 |
| 3,211,114 | 10/1965 | Ucinhaska | 111—7 |

ABRAHAM G. STONE, *Primary Examiner.*

ROBERT E. BAGWILL, *Examiner.*